Aug. 26, 1941.    W. DE F. CROWELL    2,253,766
EYE PROTECTING MEANS FOR VEHICLES
Filed April 27, 1939    2 Sheets-Sheet 2
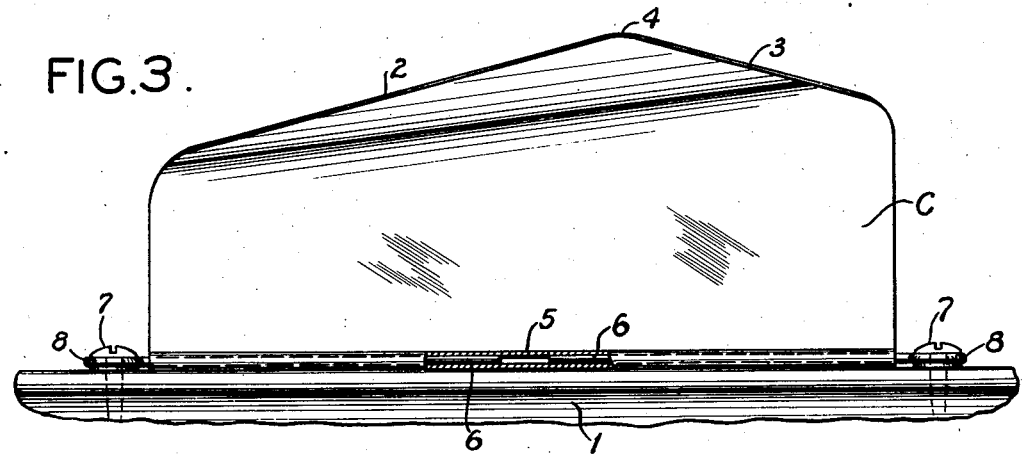
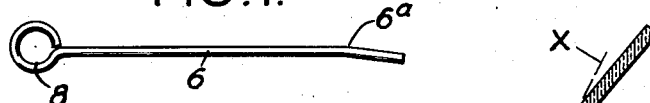
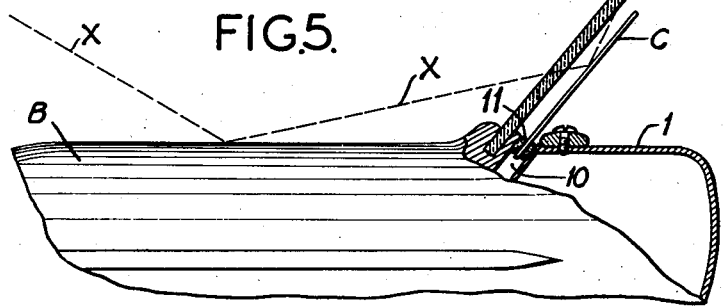
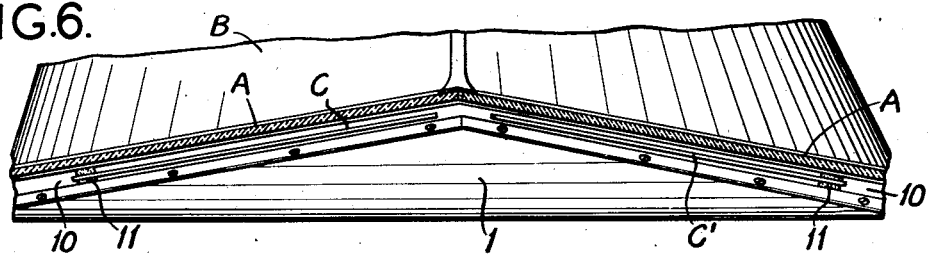
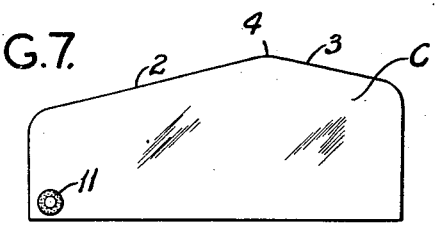
INVENTOR;
WILLIAM DE F. CROWELL
BY *Nello R. Church*
ATTORNEY Patented Aug. 26, 1941

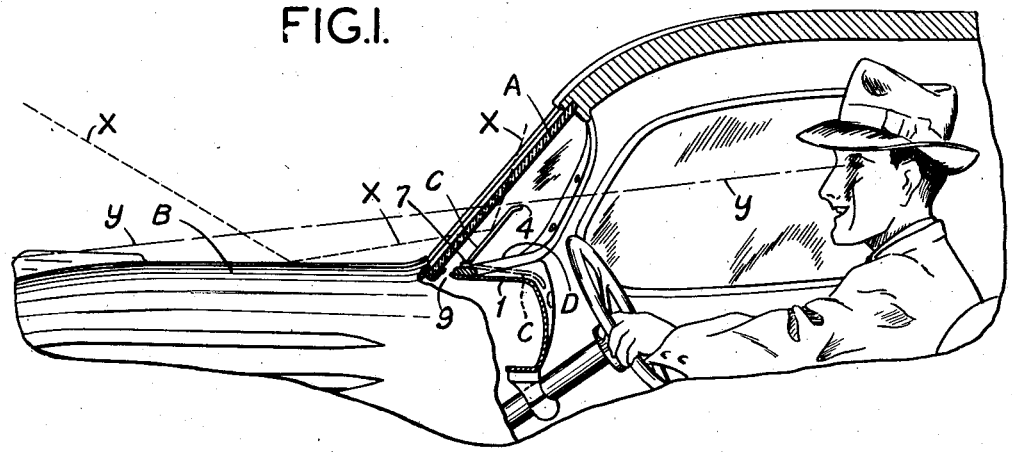
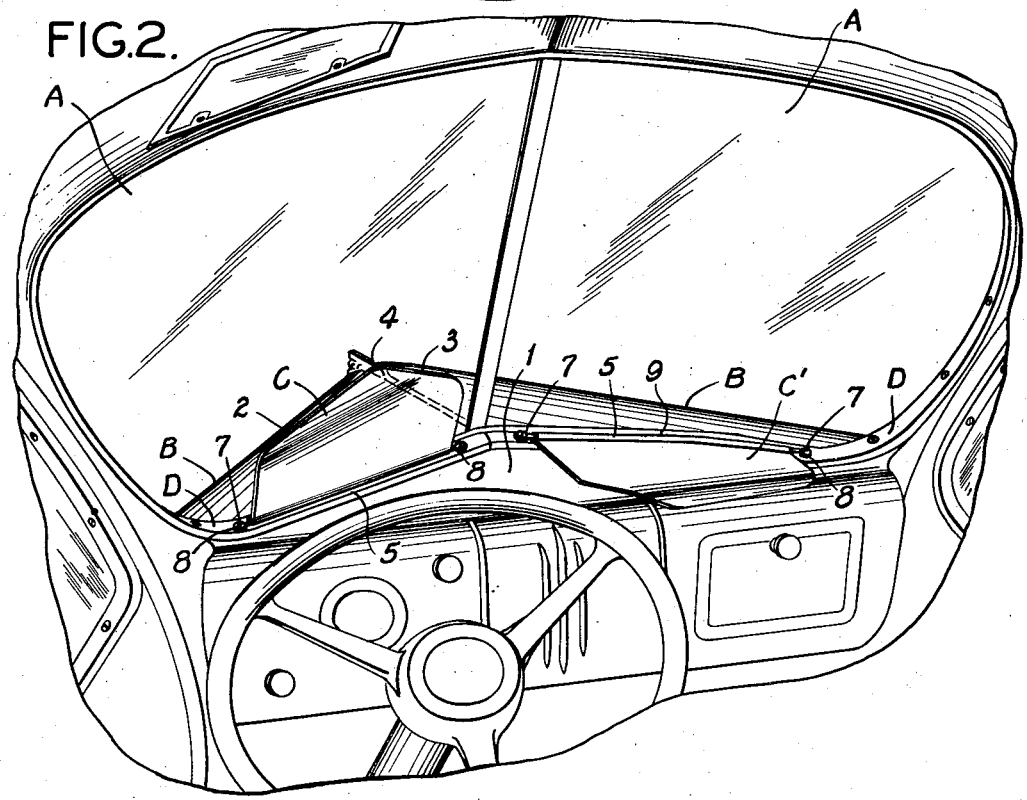

2,253,766

UNITED STATES PATENT OFFICE 2,253,766

EYE PROTECTING MEANS FOR VEHICLES

William de F. Crowell, St. Louis, Mo.

Application April 27, 1939, Serial No. 270,293

3 Claims. (Cl. 296—97)

This invention relates to a device or means that is intended to be used on automobiles, aeroplanes, motor boats, and other vehicle bodies for preventing the driver or occupant of the front seat of the vehicle from being subjected to annoyance or discomfiture from reflected rays of light while the vehicle is traveling towards the sun.

Vehicles of the kind mentioned are usually equipped with a wind shield and with a substantially horizontally-disposed portion provided with a brilliant or polished surface, that projects forwardly from the bottom edge of the wind shield. In automobiles and aeroplanes said brilliant surfaced, horizontally-disposed portion consists of the hood of the engine compartment, and the top surface of the body cowl that is arranged in front of the wind shield; and in motor boats, said horizontally-disposed portion consists of the forward deck of the boat. When such a vehicle is being driven towards the sun, particularly when the sun is low, the action of the sun's rays on the polished or brilliant surface of said horizontally-disposed portion is apt to produce an intense glare that is annoying and liable to cause eye strain to a front seat occupant, and in many instances, causes blinding rays of light to be reflected into the eyes of the driver of the vehicle, thereby hampering the driver in guiding the vehicle and frequently resulting in serious accidents.

The main object of my invention is to provide a device or means of novel construction and arrangement, that will protect the driver or front seat occupant of a vehicle from discomfiture or annoyance of the kind mentioned, and thus reduce or eliminate a very serious hazard to safe driving.

And another object of my invention is to provide a device or means of the kind previously described, that is inexpensive to manufacture, easy to install, and of such design and construction that it does not mar the appearance of the vehicle on which it is used, or interfere with the proper functioning of the other parts of the vehicle.

Figure 1 of the drawings is a fragmentary side elevational view partly broken away, of an automobile equipped with an eye protecting shield pivotally mounted on the cowl of the body of the automobile.

Figure 2 is a perspective view, looking forwardly through the wind shield of the vehicle, illustrating the pivotal mounting of the eye protecting shield and showing how said shield is always exposed to view.

Figure 3 is an elevational view of the eye protecting shield shown in Figures 1 and 2.

Figure 4 is a detail view of one of the rods employed to hinge or pivotally mount the eye protecting shield on the body cowl.

Figure 5 is a fragmentary view, partly in section and partly in side elevation, illustrating my invention, consisting of eye protecting shields mounted in slots in the body cowl, and adapted to be moved downwardly into said slots when they are not in use.

Figure 6 is a horizontal sectional view of the structure illustrated in Figure 2, for the purpose of showing the relative arrangement of the wind shield and the eye protecting shields; and Figure 7 is an elevational view of one of the eye protecting shields used in the structure shown in Figures 5 and 6.

In the accompanying drawings, A designates a vehicle wind shield, and B designates, as an entirety, a portion of the vehicle that is located in front of the wind shield, and which has a polished or brilliant surface that is liable to cause beams of light to be reflected into the eyes of the driver or other front seat occupant. In the case of automobiles and aeroplanes, the portion B consists of the horizontally-disposed top part of the hood of the engine compartment and the outside portion of the body cowl that is located in front of the wind shield; and in the case of a motor boat, the said portion B consists of the forward deck of the boat. Due to the fact that this substantially horizontally-disposed portion B of the vehicle is invariably provided with a lacquered or varnished surface that is brilliant or polished, sun rays are liable to strike said polished surface when the vehicle is being driven towards the sun, thereby causing beams or rays of light to be reflected into the eyes of the front seat occupants, as indicated by the broken line $x$ in Figure 1. In order to protect the driver or front seat occupant from such reflected light, the vehicle is equipped with a means which is so constructed and arranged with relation to the eyes of the front seat occupants and the portion B of the vehicle that is located in front of the wind shield, that it intercepts rays or beams of light that are reflected from the portion B into the eyes of the front seat occupant or occupants. Said means is composed of either one relatively long eye protecting shield, or a pair of shorter eye protecting shields, arranged adjacent the bottom edge of the wind shield, preferably at the rear side of same, and so disposed as to substantially blanket out the forwardly-projecting portion B of the vehicle, without however, substantially interfering with the vision of the road or space ahead, thereby effectively preventing the front seat occupants from being subjected to discomfiture or annoyance, or becoming blinded by sun rays that strike the forwardly-projecting portion B, and are thence reflected upwardly and rearwardly from same, when the vehicle is traveling towards the sun.

Figures 1, 2, 3 and 4 illustrate the vehicle as being equipped with two pivotally mounted eye protecting shields C and C', one for the driver, and one for the other occupant of the front seat, arranged at the bottom edge of the wind shield A on the rear side of same, said C and C' being preferably formed from translucent or opaque material. When the vehicle is equipped with a wind shield A of substantially V shape in horizontal section, the two eye protecting shields C and C' are disposed in angular relationship, with each other, as shown in Figure 2, but are so disposed with relation to the wind shield A, that each of said shields C and C' is set at approximately the same angle as the particular portion of the wind shield A with which it co-acts. In the case of a straight or one-piece wind shield that extends transversely of the vehicle body, the eye protecting means may be composed of either a single long shield, or separate individual shields for the front seat occupants.

Figure 2 of the drawings shows the driver's eye protecting shield C arranged in its operative position, and the shield C' for the other occupant of the front seat arranged in its inactive or inoperative position. The bottom edges of the eye shields C and C' are arranged in sufficiently close proximity to the portion 1 of the body cowl, arranged on the interior of the vehicle body behind the wind shield A, that light reflected from the portion B of the vehicle cannot pass rearwardly under the bottom edges of said eye shields in quantities enough to cause annoyance to the user. While the particular form, shape or outline of the eye shields C and C' may vary, it is preferable to make each of said shields of such form that when it is arranged in its operative position, the user located behind same will have an unobstructed view of the road or space ahead, and the brilliant surfaced portion B of the vehicle located in front of the wind shield will be effectively blocked out from the user's view. Accordingly, if the vehicle is being driven towards the sun, the eye shields C and C' will protect the front seat occupants from eye strain, resulting from glare, produced by the action of the sun's rays on the portion B of the vehicle, and will prevent the front seat occupants from being blinded by rays of light reflected from the said portion B of the vehicle. Preferably, the top edges of the eye shields C and C' are shaped so that each of said edges conforms approximately to the transverse shape of the portion B of the vehicle, as viewed from the particular point at which the user of the shield is located. For example, the eye shield C, arranged in front of the driver of the vehicle, is provided with a top edge that comprises a portion 2 that slopes upwardly from the left hand end of the shield and merges into a portion 3 that slopes downwardly towards the right hand end of the shield, thus producing a shield of varying height or depth, whose highest or deepest portion, designated by the reference character 4 in Figure 7, is located slightly to the right of the exact center of the shield. Inasmuch as said shield C is disposed at a slight angle to the front seat of the vehicle, instead of being arranged parallel to the front seat, the top edge of said shield will approximately simulate the front edge of the hood B, as viewed by the driver from his position slightly to the left of the longitudinal axis of the vehicle. In other words, when the driver peers forwardly through the left hand portion of the wind shield A, when the eye shield C is arranged in its operative position, shown in Figure 2, said eye shield will block out the hood B of the vehicle, without however, cutting off the view of the road or space ahead, due to the fact that the top edge of said eye shield simulates or conforms approximately to the shape of the portion of the hood that would lie within the vision of the driver, if the eye shield C were omitted. By referring to Figure 1, it will be noted that the shield C just clears the line of vision of the driver, indicated by the reference character y in Figure 1, and by referring to Figure 2 it will be noted that the top edge of the shield C simulates the front edge portion of the hood B that would be within the line of vision of the driver, if the vehicle were not equipped with an eye shield C. Hence, the eye shield C will intercept beams or rays of light reflected from the hood B, or other polished or brilliant portion of the vehicle located in front of the wind shield, without however, reducing or interfering with the driver's vision of the road or space ahead.

In order that the eye shields C and C' may be adjusted so as to better adapt them to the particular user or users, said shields are preferably mounted in such a way that they can be moved or adjusted so as to raise or lower the top edges of said shields. It is also preferable to construct or mount said eye shields in such a way that they can be easily shifted into an inconspicuous position when they are not in use. In Figures 1 and 2 the eye shields C and C' are shown as being pivotally mounted on the portion 1 of the cowl located behind the wind shield, whereby either one of said shields may be swung downwardly into an inconspicuous position, where it conforms practically to the shape of the portion 1 of the cowl, as represented by the eye shield C' in Figure 2, or can be swung upwardly into parallel relationship with the wind shield A, as represented by the eye shield C in Figure 2. By tilting said eye shield more or less, the top edge of same can be raised or lowered with relation to the line of vision y of the user, thereby adapting it to a tall person or to a short person. In Figures 1 to 4 of the drawings, each eye protecting shield is illustrated as being formed from a piece of sheet material, provided at its bottom edge with a curled, rolled, or bent portion 5 that constitutes a bearing in which a pintle pin or pins may be inserted. Thus, as shown in Figures 3 and 4, the shield C is mounted on the cowl 1 of the vehicle by pintle pins 6 positioned in the tubular bearing 5 at the bottom edge of the shield, and secured to the cowl by screws 7 that pass through eyes 8 in the outer ends of the pintle pins, each pintle pin having a bent portion 6ª (see Figure 4) that exerts sufficient frictional pressure on the tubular bearing 5 on the shield to insure that the shield will remain in the position in which it is set or adjusted. Usually, the shields C and C' will be attached to the finishing moldings D arranged on the inner side of the wind shield A of the vehicle, instead of being attached directly to the horizontally-disposed portion of the inside cowl that forms practically a continuation of the instrument panel of the vehicle.

In Figures 5, 6 and 7 of the drawings I have illustrated my invention, consisting of eye shields C and C' adjustably mounted in slots or guideways 10 formed in the portion 1 of the cowl, at the bottom edge of the wind shield. When not in use, the shields C and C' can be lowered into the slots 10, where they are entirely out of the way. They can be pivotally mounted in the slots 10, or they can be reciprocatingly mounted in said slots and held in adjusted position by means of friction devices 11 constructed so as to snugly engage the walls of the slots. The advantage of such a construction is that the eye shields are completely concealed or hidden from view, when they are not in use, and when it is desired to use said shields, they can be adjusted upwardly through the slots 10, more or less, so as to obscure or blanket from the eyes of the driver or front seat occupant, reflections of light which come from the vehicle hood or other portion of the vehicle located in front of said eye shields.

While I have herein illustrated my invention embodied in or applied to an automobile, I wish it to be understood that the invention is applicable to any type or kind of vehicle, in which there is a portion located in advance of the front seat of the vehicle that is liable to act as a reflecting surface for light in such a manner as to produce an intense glare that is annoying or harmful to the front seat occupants, or to produce blinding rays that interfere with the control or steering of the vehicle. The vehicle may be equipped with either one or a plurality of eye shields, and while it is preferable to construct said shields so they can be adjusted and also shifted into an inconspicuous or inactive position, when not in use, this is not an essential characteristic. Nor is it essential that the top edge of the eye shield or shields be shaped to simulate or conform approximately to the cross-sectional shape of the portion of the vehicle which said shield or shields are intended to block out, although such a shape or form for the top edges of the shields is desirable, in that it prevents said shields from interfering with the driver's vision of the road or space ahead of the vehicle.

Having thus described my invention, what I claim as new and desire to secure by Letters Patent is:

1. In a vehicle, the combination of a body provided with a cowl portion, a wind shield on said cowl portion that slopes upwardly and rearwardly, said cowl portion being provided with a slot or guideway extending downwardly from the top side of the cowl at the rear side of said wind shield, an eye protecting member made of opaque material adjustably mounted in said guideway and adapted to be adjusted upwardly more or less into a position behind the wind shield, for the purpose described, and a friction means for preventing accidental movement of said eye protecting member relatively to its guideway.

2. In a vehicle, the combination of a body provided with a cowl portion, a wind shield on said cowl portion, said cowl portion being provided with a guideway that extends downwardly from a slot in the top side of said cowl portion disposed at the rear side of the wind shield, and an eye protecting member made of opaque material, adjustably mounted in said guideway and adapted to be moved downwardly in same into a position where said eye protecting member is concealed from view when it is not in use and adapted to be moved upwardly in said guideway, more or less, so as to arrange said eye protecting member in an active or operative position above the top surface of said cowl portion.

3. A structure of the kind described in claim 2, in which the slot in said cowl portion is disposed at an angle to the front seat of the vehicle and the top edge of said eye protecting member slopes upwardly from the ends towards the center of said member, the highest point of said top edge being located at one side of the vertical center of said eye protecting member, whereby the top edge of said member will approximately simulate the front edge of the hood of the vehicle when viewed by the driver in charge of the vehicle.

WILLIAM DE F. CROWELL.